Feb. 12, 1935.  P. B. R. BAAS  1,991,310
METER TESTING APPARATUS
Filed Jan. 2, 1934  4 Sheets-Sheet 1

WITNESSES

INVENTOR
Philip B. R. Baas
BY
ATTORNEY

Feb. 12, 1935. P. B. R. BAAS 1,991,310
METER TESTING APPARATUS
Filed Jan. 2, 1934  4 Sheets-Sheet 2

INVENTOR
Philip B. R. Baas

Feb. 12, 1935. P. B. R. BAAS 1,991,310
METER TESTING APPARATUS
Filed Jan. 2, 1934 4 Sheets-Sheet 3

WITNESSES
INVENTOR
Philip B. R. Baas
BY
ATTORNEY

Feb. 12, 1935.   P. B. R. BAAS   1,991,310
METER TESTING APPARATUS
Filed Jan. 2, 1934    4 Sheets-Sheet 4
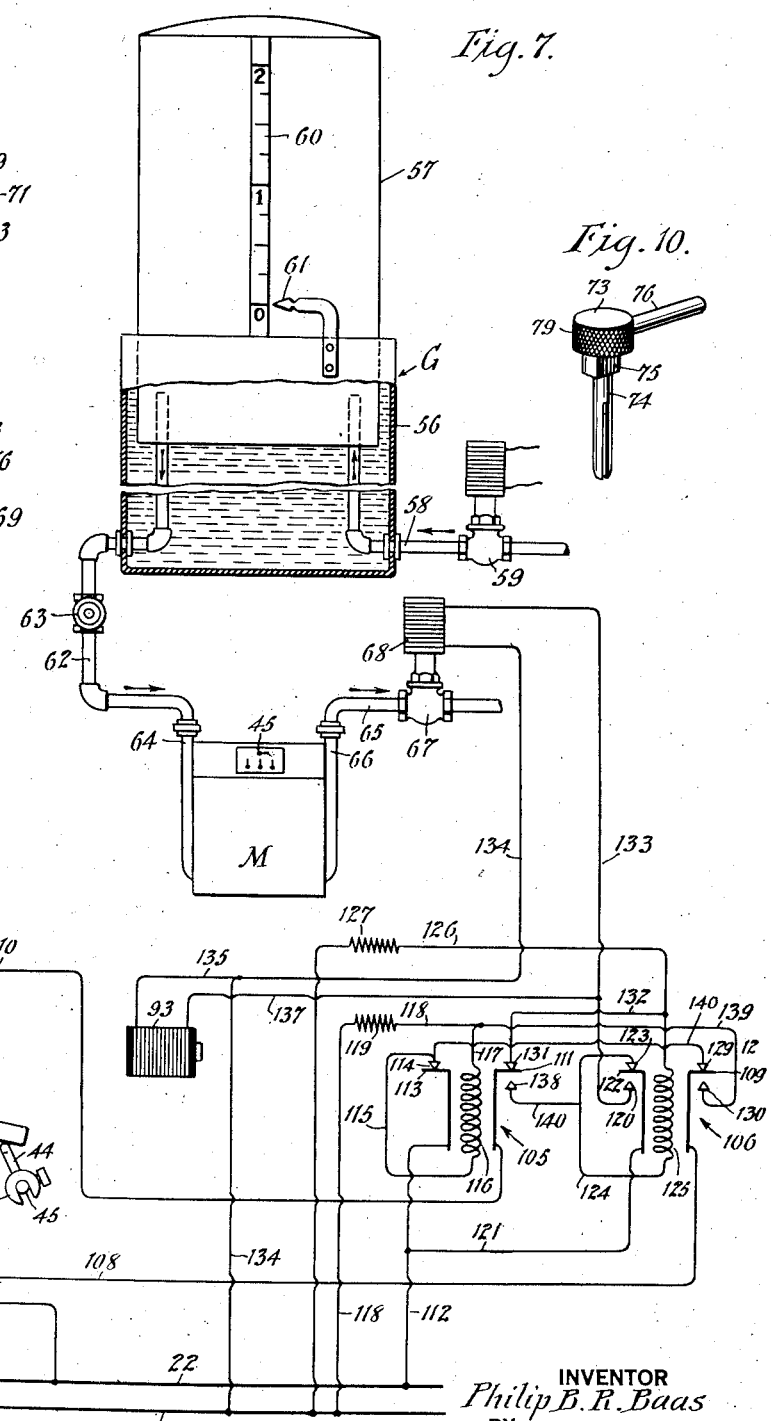
Fig. 8.
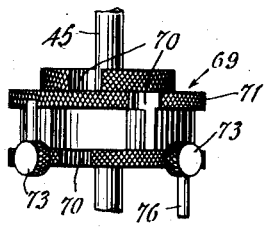
Fig. 9.
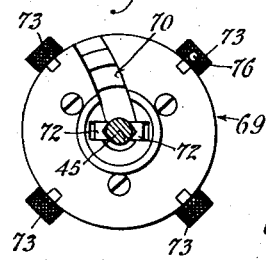
Fig. 7.
Fig. 10.
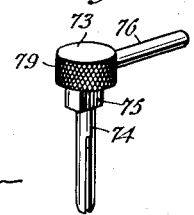
WITNESSES
Edw. Thorpe
S. W. Foster
INVENTOR
Philip B. R. Baas
BY
Munn, Anderson, Stanley, Foster & Leddy
ATTORNEY Patented Feb. 12, 1935

1,991,310

UNITED STATES PATENT OFFICE 1,991,310

METER TESTING APPARATUS

Philip B. R. Baas, Brooklyn, N. Y., assignor to Brooklyn Borough Gas Company, Coney Island, N. Y., a corporation of New York Application January 2, 1934, Serial No. 705,020

14 Claims. (Cl. 73—51)

This invention relates to a meter testing apparatus, an object of the invention being to provide an accurate automatic means for testing gas meters and the like.

This invention constitutes an improvement in the apparatus disclosed in Patent No. 1,934,291, granted to me November 7, 1933, on a Meter testing device.

A further object is to provide an apparatus which can be readily connected to a gas meter, which will permit the meter to operate through a desired cycle, and which will automatically stop the flow of air or other fluid to the meter after the desired cycle of operation is completed.

A further object is to provide a gas meter testing apparatus which is operated by contact with a member on the index spindle of the meter and which may be adjusted as to indicate the operation of the meter through a complete turning movement of the spindle or through 90°, 180° or 270°.

With these and other objects in view, the invention consists in certain novel features of construction and combinations and arrangements of parts, all of which will be more fully hereinafter described and pointed out in the claims.

In the accompanying drawings—

Figure 7 is a diagrammatic view illustrating the invention and illustrating the relationship of the several parts;

Figure 8 is a plan view of my improved chuck showing the same on the index spindle of the gas meter;

Figure 9 is a view in elevation at right angles in Figure 8, which constitutes an inverted plan view of Figure 8; and Figure 10 is an enlarged view of one of the fingers carried by the chuck.

Figure 4:
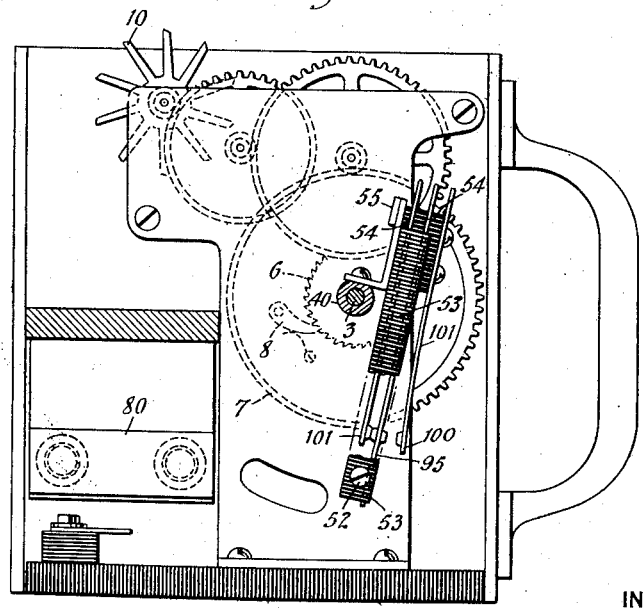
Figure 4 is a view in sectional elevation, the view being taken on the line 4—4 of Figure 3.

My improved apparatus comprises a box or casing 1, having a partition 2 therein, and supporting a shaft 3 which extends through the walls of the box as well as through the partition and has rotary mounting therein. A milled disk or hand wheel 4 is secured to the shaft 3, is located outside of the box 1, and is preferably formed with a fixed hub 5 receiving the shaft 3, and pinned or otherwise secured to turn with the shaft. A ratchet wheel 6 is fixed to the shaft 3, and a gear wheel 7, loose on the shaft 3, carries a pawl 8 which meshes with the ratchet wheel 6 to couple them in one direction of movement. The gear wheel 7 drives a gear train 9, which is very much like the ordinary arrangement of clock gears, and this gear train 9 imparts motion to a stop wheel 10, which has a circular series of radially projecting fingers, as shown clearly in Figures 4 and 5 of the drawings.

A ratchet wheel 11 is secured to the shaft 3, and a series of pivoted pawls 12 is connected to the partition 2 and normally held by gravity out of operative engagement with the ratchet wheel 11. Below the pawls 12 a curved lower end of a lever 13 is positioned, and this curved lower end portion of the lever 13 carries a series of curved springs 14 against which the pawls 12 normally rest. The lever 13 is pivotally connected intermediate its ends, as shown at 15, to a bracket 16 secured in the box 1, and the upper end of this lever 15 constitutes an armature 17 which is attracted by an electromagnet 93 secured in the box 1. The upper end of this lever 13 also carries a finger 19 which is movable into the path of the fingers of the stop wheel when the magnet is energized. Also, it will be noted when the magnet is energized the curved lower end of the lever 13 will be moved upwardly, causing the springs 14 to press the pawls 12 into operative engagement with the ratchet wheel 11 and prevent retrograde movement of the latter. A stop pin 20' is provided on the partition 2 to limit the pivotal movement of the lever 13 in one direction.

Figure 5:
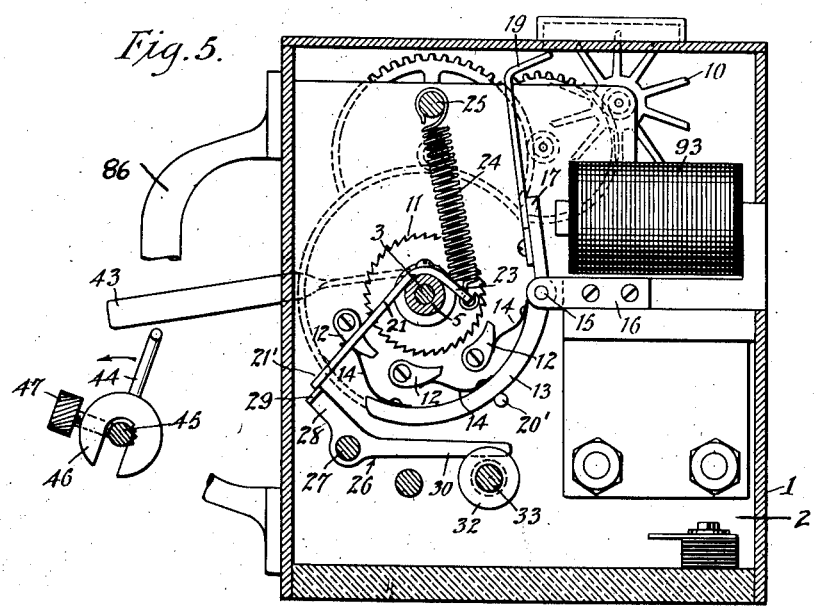
Figure 5 is a view in section on the line 5—5 of Figure 1.
Figure 6:
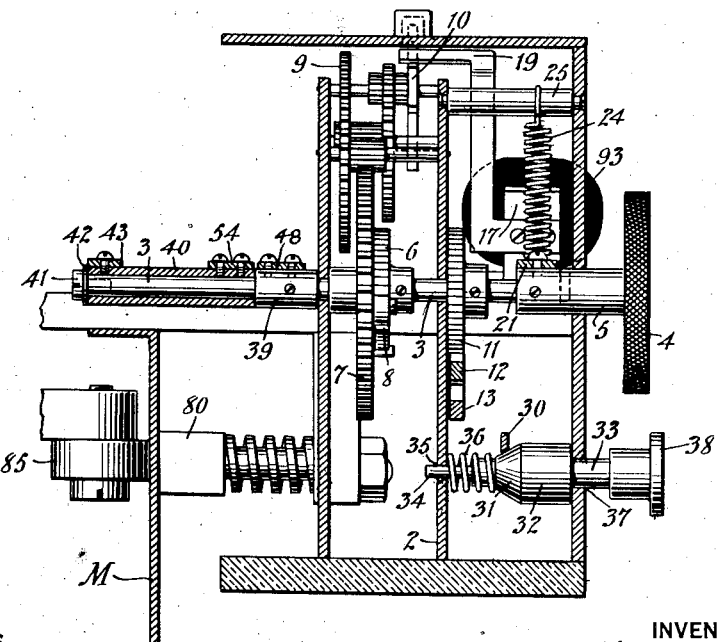
Figure 6 is a view in section on the line 6—6 of Figure 1.

A bar 21, bent intermediate its ends to form a relatively long crank arm 21' and a relatively short crank arm 23, is secured at its bend to the hub 5 of the disk or wheel 4. The shorter crank arm 23 is connected by a coil spring 24 with a fixed pin 25 on the partition 2, so that when this spring 24 is put under tension it will cause the shaft 3 to turn, imparting motion to the gear train, as will more fully hereinafter appear. The longer crank arm 21' when moved to its extreme left position, as indicated in Figure 5 of the drawings, is located in the path of a catch lever 26. This catch lever 26 is angular in form having a pivot 27 at its angle pivotally connecting the catch lever to the box or casing 1. The length of this lever from its pivot to one end is appreciably shorter than the other end, and the shorter end 28 of the lever 26 has a laterally projecting tongue 29, which is adapted to engage the crank arm 21' when the latter is in the position shown in Figure 5 to hold the spring 24 under tension and to prevent movement of the gear train. The longer end 30 of this catch lever 26 constitutes a weighted arm which holds the latch bar in normal position by gravity.

The longer end 30 of the catch lever 26 normally rests upon a conical or bevelled end 31 of an enlargement 32 constituting a fixed part of a plunger 33 supported in the box and below the catch lever. This plunger 33 has a reduced inner end 34 movable through an opening 35 in the partition 2, with a coil spring 36 mounted on the reduced end of the plunger between the partition 2 and the enlargement 31, exerting outward pressure on the enlargement and holding it against the outer wall of the box 1. The outer end of the plunger 33 is of less diameter than the enlargement 32, and projects through an opening 37 in the wall of the box 1, with a push button 38 thereon which can be manually operated to force the enlargement inwardly, and this will exert a cam action on the longer end 30 of the catch lever 26, elevating said longer arm and moving the tongue 29 out of the path of the lever 21'. This permits the longer end 23 of the lever 21 to swing to the right, in Figure 5, permitting the spring 24 to impart motion to the gear train and also, of course, to impart turning movement to the shaft 3 although this movement, it must be understood, is only through a relatively small arc.

The shaft 3 extends beyond the wall of the box 1 and has a relatively short sleeve or collar 39 fixed thereon, and a longer sleeve 40 mounted loosely on the shaft and held against longitudinal movement by any approved means. I have illustrated a simple means for holding the sleeve 40 against longitudinal movement on the shaft 3, which consists of a headed screw 41 tapped into the end of the shaft and holding a washer 42 against the end of the sleeve 40.

A trip arm 43 is secured to the sleeve 40 projecting at right angles to the sleeve and is adapted to be located in the path of movement of a finger 44 which is secured to the index spindle 45 of a gas meter, indicated generally by the reference character M. This finger 44 may be carried by a recessed block 46 which can be positioned over the spindle 45 and secured thereon by a set screw 47. However, I preferably provide a form of finger-carrying chuck, illustrated in Figures 8 and 9 of the drawings and more fully hereinafter described.

A bracket 48 is secured to the sleeve 39, the latter being fixed to the shaft 3, and this bracket supports at one end three contact members 95, 100 and 101 respectively. The contact member 95 is a double throw contact switch member, having contacts 96 and 97 on opposite sides thereof, the contact 96 adapted to engage and normally engaging contact 98 on the switch arm 101, and the contact 97 adapted to engage a contact 99 on the switch arm 100. These three contact members are insulated from each other by suitable blocks of insulation 54', so that the blocks of insulation 54' and the bracket 48 and the three contacts 101, 95 and 100 constitute in effect a single element which is caused to turn or pivot when the shaft 3 is moved. The intermediate contact member 95 is longer than the contact members 100 and 101, and is adapted to be engaged by a pin 52 on an arm 53 of insulating material. This arm 53 is secured to a bracket 54 on the loose sleeve 40, and said bracket 54 has a laterally projecting finger 55 located behind the bracket 48. It will be noted that the trip arm 43 and the arm 53, which is preferably of insulation, both have fixed relation to the sleeve 40 which is loose on shaft 3, so that these three parts, the trip arm 43, the sleeve 40 and the arm 53, constitute in effect a single movable element which is caused to move by the finger 44 on the index spindle 45 of the gas meter.

In testing gas meters it is customary to employ a gasometer G having a body 56 and a bell 57, such as illustrated in Figure 7 of the drawings. This gasometer is of the usual type having an inlet 58 with the valve 59 therein, which may be controlled in any suitable manner to admit air from a pump or other source to fill the gasometer. The bell 57 is provided with a scale 60 which registers with a pointer 61 on the body 56 to indicate the quantity of air taken from the bell.

62 represents an outlet pipe from the gasometer having a manually operable valve 63 therein. This pipe 62 is adapted to be connected to the inlet 64 of the gas meter M. A pipe 65 is connected to the outlet 66 of the meter and has a valve 67 therein controlled by a solenoid 68. It is to be understood that the opening and closing of the valve 67 by means of the solenoid 68 is automatically controlled by the mechanism heretofore described, and this operation is caused by the contact of the finger 44 on the index spindle of the gas meter with the tripping arm 43, and while in most cases it is desirable that there be a complete revolution of the spindle, in some cases it is deemed sufficient to test the meter through a sector of the complete revolution as, for example, through a movement of 60° or 90°. In order that this may be readily accomplished I provide a device indicated in detail in Figures 8 and 9 of the drawings, in which the reference numeral 69 is employed to indicate generally a chuck having a recessed entrance 70 to receive the spindle 45, and provided with a movable or turning member 71 to cause toothed blocks 72 to grip the spindle 45 and hold the chuck thereon.

The chuck is of circular or cylindrical form and has spaced around the same at a distance of 90° finger assemblages 73. One of these finger assemblages is illustrated in perspective in Figure 10, from which it will be noted that the assemblage has a post 74 with an angular upper portion 75 fitting correspondingly shaped openings and recesses in the chuck, and fingers 76 projected at right angles from milled heads 79 on the finger assemblage. It will be obvious that these finger assemblages may be drawn out from the chuck and turned and then forced into the chuck, so as to either project the fingers 76 from the face of the chuck or position them across the body of the chuck out of the way. It is obvious that any one or two of these fingers may be employed to initiate and stop the movement of the apparatus, so as to permit the flow of air through the meter through a complete revolution of the index spindle or a 90°, 180°, or 270° sector.

Figure 1:
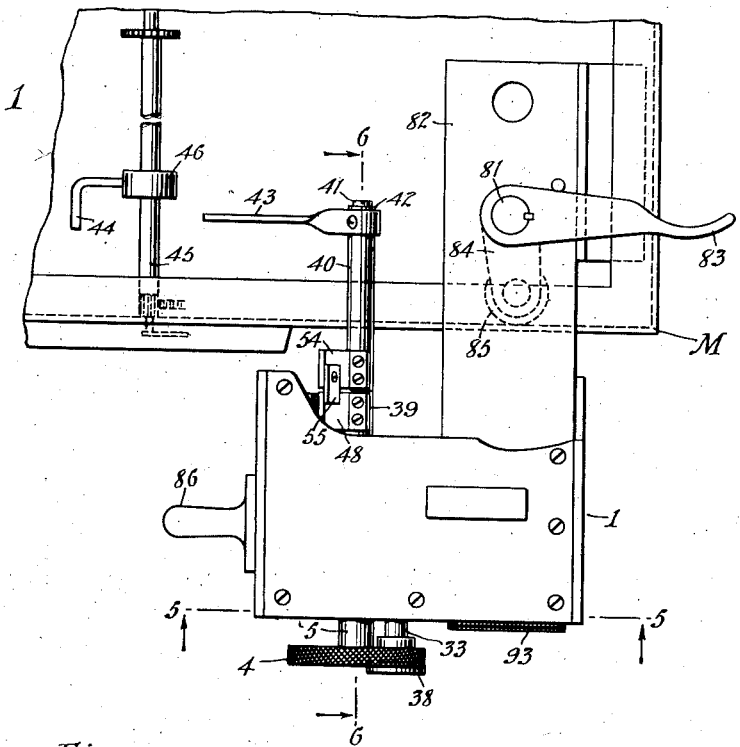
Figure 1 is a broken plan view illustrating my improved apparatus operatively connected to a gas meter.
Figure 2:
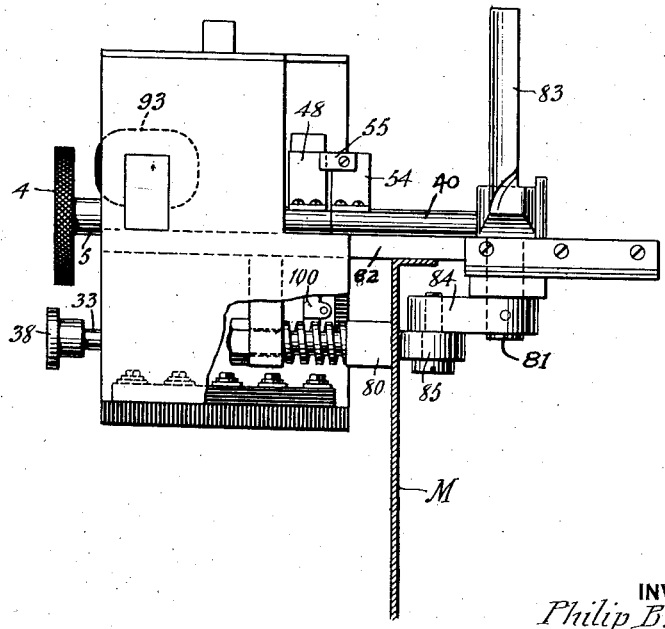
Figure 2 is a view mainly in end elevation looking at the right hand end of Figure 1, with parts broken away and in section for clearness.
Figure 3:
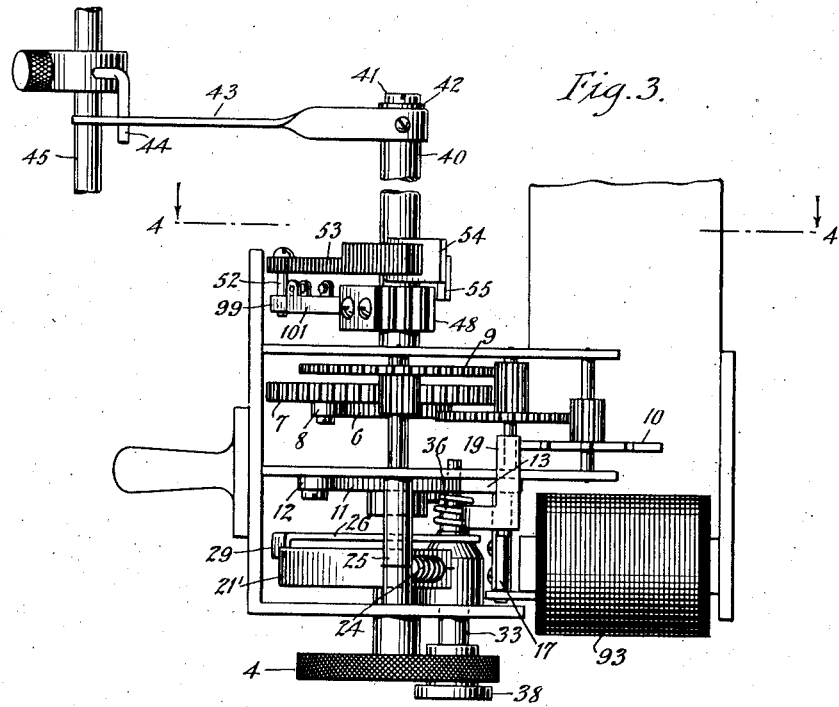
Figure 3 is a plan view of the apparatus with portions of the box or casing removed.

While, of course, this invention is not limited to any particular means for securing the apparatus to the meter, I have shown a clamp which answers the purpose. This clamp comprises a spring-pressed plunger 80 which is carried by the box 1 and adapted to engage the outer face of the gas meter. A short shaft 81 is projected through an extension plate 82 fixed to the box 1 and has a manually operable arm 83 above the extension 82 and a short crank arm 84 below the extension. This crank arm 84 carries a roller 85 which can be pressed against the inner face of the meter to clamp the wall of the meter between said roller and the block 80, as clearly indicated in Figures 1 and 2 of the drawings. I also illustrate a handle 86 which is a fixed part of the casing 1, which facilitates the manipulation and manual movement of the apparatus.

Referring to the diagram illustrated in Figure 7 of the drawings, the parts are illustrated in their initial set position to start testing of the meter. The finger 44 has engaged the tripping arm 43 sufficiently to cause the pin 52 to swing the contact member 95 so that contact 96 is separated from contact 98 and contact 97 is moved into engagement with contact 99.

The solenoid 68, the locking magnet 93, the contact member 95 and the contacts 98 and 99 are connected with relays 105 and 106, as illustrated in Figure 7 of the drawings.

A conductor 107 connects the lead 22 with the contact member 95, a conductor 108 leads from the contact 98 to a contact 109, and a conductor 110 leads from the contact 99 to the contact 111. The relays 105 and 106 are normally energized as illustrated in Figure 7 of the drawings. It will be seen that a conductor 112 is connected with the lead 22 and a contact 113 which normally engages the contact 114 from which leads a conductor 115 to the coil 116, a conductor 117 leading from the coil 116 from which branches a conductor 118 having a resistance 119, the conductor 118 being connected with the lead 20. The relay 105 is thus normally energized. A conductor 121 is connected with the lead 22 and with the contact 122, which normally engages the contact 123, a conductor 124 leading from the contact 123 to the coil 125, from which leads a conductor 126 having a resistance 127, the said conductor 126 being connected with the lead 20. The relay 106 is thus normally energized.

When the parts are in their initial position with the tripping arm brought to rest on the finger 44, which is secured to the metal index spindle 45, the contact arm 95 is moved to the right, in Figure 7, separating contacts 96 and 98 and bringing contacts 97 and 99 together, to de-energize the coil 125 and remove the contact 122 from the contact 123 and bring the contact 122 into engagement with the contact 120, and will disengage the contact 109 from the contact 129 and bring the contact 109 into engagement with the contact 130, a current passing from the contact 99 through the conductor 110 to the contact 111, the contact 131, through the conductor 132 to the conductor 126 and through the resistance 127 to the lead 20, which will short-circuit the coil 125 and will de-energize the relay 106 and, with the contact 122 at the contact 120, current will flow from the lead 22 through the conductor 121, the contact 122, the contact 120 to the conductor 133, to the solenoid 68 at the valve 67, and then through the conductor 134 to the lead 20. A conductor 135 leads from the conductor 133 to the locking magnet 93, and a conductor 137 leads from the locking magnet 93 to the conductor 134. It will, therefore, be understood that when the parts are thus set and the operation of the apparatus initiated the first result is to bring contacts 97 and 99 together and this, through the medium of the electric circuit, will immediately cause the valve 67 to open permitting a flow of the air or other fluid to the meter M and, further, and the locking magnet 93 will lock the mechanism by means of the finger 19 and stop wheel 10 to prevent a further movement of the mechanism.

With the passage of the air or gas from the gasometer bell 57 to the meter M, the index spindle 45 will be rotated and, with the rotation of the spindle the tripping lever 43 will move to permit the passage of the finger 44, this being possible in view of the resiliency of the contact member 95 and the resilient arm 100 on which the contact 99 is mounted. When the finger 44 slips off the tripping arm 43 the contact 97 will move from the contact 99 and the contact 96, under the action of the resilient contact member 95, will again contact with the contact 98, which will cause the relay 105 to become de-energized and which will open the contacts 113 and 114 and the contacts 111 and 131 and the contact 111 will engage the contact 138. With the relay 106 de-energized a current will now pass from the contact 96 to the contact 98, through the conductor 108 to the contact 109, to the contact 130, the conductor 139 to the conductor 118 and through the resistance 119. This will short-circuit the relay 105. Both relays are now open.

When the index spindle 45 makes a complete revolution it will engage the tripping arm 43 and cause contact member 95 to move so that the contact 97 will again engage with the contact 99. The current will now pass from the lead 22 to the contact 97, to the contact 99, to the conductor 110, to the contact 111, to the contact 138, to the conductor 140, to the conductor 124 and through the coil 125, which will energize the relay 106, breaking the circuit at the contacts 122 and 120 and thereby de-energizing the solenoid 68 at the valve 67 closing valve and also de-energizing the locking magnet 93. It will be understood that when the tripping arm 43 is free from the finger 44 the contact member 95 will again assume the position where the contact 96 will engage the contact 98, and a current will flow from the contact 98 through the conductor 108 to the contacts 109 and 129 to the conductor 140, the conductor 115, through the coil 116, the conductor 118, the resistance 119 to the lead 20. Both relays 105 and 106 will now be energized.

It will be understood that, with the complete rotation of the index spindle 45, a quantity of air or other fluid has passed through the meter and has been indicated by the index hand, in accordance with the adjustment of the meter. The actual amount of air or other fluid which has passed through the meter may be accurately determined by inspecting the scale 60 on the gasometer bell 57. It may be quickly determined whether or not the meter is properly adjusted for accurate reading by examining the position of the fixed pointer with reference to the scale 60 on the gasometer bell 57 after the index spindle has made a complete rotation as the valve 67 at the outlet from the gasometer has been opened at the commencement of the flow of the air or other fluid from the gasometer to the meter and has been closed after one complete rotation of the index spindle 45.

Having described in detail the electric circuit and the general automatic control by which the meter is tested, I will now briefly set forth the sequence of operation of the several mechanical parts illustrated in Figures 1 to 6 of the drawings:

Assuming, of course, that the box 1 is properly clamped to the meter and the shaft 3 has been turned by the hand wheel 4 to bring the trip arm 43 to the position shown in Figure 5 above the finger 44 on the index spindle 45, the apparatus is set for operation. On turning the shaft 3 to set the apparatus the arm 21' is swung to the left of Figure 5 until it engages the finger 29 on the catch lever 26, and during this movement the spring 24 is put under tension. When the operator is ready to test the meter he pushes the button 38 inwardly and, due to the cam action on the longer end 30 of the catch lever 26, elevates this longer end and moves the shorter end 38 of the catch lever out of the path of movement of the arm 21'. The spring 24 then causes the shaft 3 to turn and move the tripping arm 43 into engagement with the finger 44 with sufficient pressure to cause the contact member to swing from its normal position with the contacts 96 and 98 together to a position to cause the contact 97 to engage the contact 99. This closes the circuits to the solenoid 68 and the electro-magnet 93. The solenoid 68 opens the valve 67 and allows air from the gasometer to pass through the meter, assuming that the valve 63 is open.

When the electro-magnet 93 is energized it will cause the finger 19 to move into the path of the finger wheel 10 and stop the gear train and hold the mechanism against further movement. At the same time the pawls 12 will be moved into operative engagement with the ratchet wheel 11 to prevent any possibility of the retrograde movement of the latter.

As the air passes through the meter it will cause the mechanism to operate, turning the index spindle 45, and this index spindle will first elevate the free end of the tripping arm 43 and ride free and clear therefrom, allowing the tripping arm to fall to its former position and in doing so the contact member 95 will be permitted to return to its former position closing contacts 96 and 98. The spindle 45 will move through a complete revolution, and as it completes this revolution it will again contact with the tripping arm 43, elevating the latter and causing the contact member 95 to move to again close contacts 97 and 99 and separate contacts 96 and 98, thus through the medium of the circuit above described will cause the valve 67 to close and will deenergize the magnet 33, allowing the parts to assume their original position.

It will thus be noted that with my improved apparatus the mechanism can be set, then placed in operative position on the meter, and whenever it is ready to start the test it is simply necessary to push in button 38 which releases the mechanism and then the operation of testing is entirely automatic.

I call attention to the fact that I locate the solenoid control valve 68 at the outlet side of the meter M so that when the manually operated valve 63 is opened air from the gasometer will pass entirely through the meter to the valve 67 before this valve is opened, and I have found that by so locating the solenoid controlled valve greater accuracy in testing the meter is insured.

It will be noted that the gear train 9 with its connected parts and the spring 24 constitute a spring motor which tends to turn the shaft 3 in one direction. The hand wheel 4 when turned in one direction, which would be to the right in Figure 5, puts the spring under tension and sets the apparatus. The inward movement of the push button 38 releases the catch member 26 and permits the mechanism to operate.

While I have illustrated what I believe to be the preferred embodiment of my invention, it is to be distinctly understood that various slight changes may be made with regard to the form and arrangement of parts without departing from my invention, and hence I do not limit myself to the precise details set forth but consider myself at liberty to make such changes and alterations as fairly fall within the spirit and scope of the claims.

What I claim is:

1. A circuit controlling mechanism for an electrically actuated valve in a gasometer and meter conduit system of a gas meter testing apparatus including a box or casing, a shaft in the casing and projecting therefrom, a spring motor operatively engaging the shaft, a manual means for turning the shaft in a direction to put the spring under tension, catch means for holding the shaft against turning movement by the spring motor, a manually operated means for releasing the catch means and permitting the motor to operate; circuit closing means operatively connected to the shaft and means on the index spindle of the gas meter to open said circuit closing means.

2. A circuit controlling mechanism for an electrically actuated valve in a gasometer and meter conduit system of a gas meter testing apparatus including a box or casing, a shaft in the casing and projecting therefrom, a spring motor operatively engaging the shaft, a manual means for turning the shaft in a direction to put the spring under tension, catch means for holding the shaft against turning movement by the spring motor, a manually operated means for releasing the catch means and permitting the motor to operate, a resilient contact member secured to the shaft and constituting a double-throw switch, other contact members also carried by the shaft spaced from the first mentioned contact member and adapted to be engaged thereby, and means on the shaft operatively engaging the first mentioned contact member and adapted to be moved by engagement with a member on the index spindle of the gas meter.

3. A circuit controlling mechanism for an electrically actuated valve in a gasometer and meter conduit system of a gas meter testing apparatus, including a box or casing, a shaft in the casing and projecting therefrom, a sleeve loose on the shaft, a tripping arm secured to the sleeve and adapted to be engaged by a member on the index spindle of the gas meter, an insulating arm also fixed to the sleeve, a plurality of contact members fixed to the shaft, one of said contact members being engageable by the insulated arm to cause the contacts to be made and broken, means compelling the sleeve and shaft to turn together in one direction and permitting the sleeve a free movement in the opposite direction, a spring motor in the box or casing operatively engaging the shaft, means for setting the motor, and means for releasing the motor.

4. A circuit controlling mechanism for an electrically actuated valve in a gasometer and meter conduit system of a gas meter testing apparatus, including a box or casing, a shaft in the casing and projecting therefrom, a sleeve loose on the shaft, a tripping arm secured to the sleeve and adapted to be engaged by a member on the index spindle of the gas meter, an insulating arm also fixed to the sleeve, a plurality of contact members fixed to the shaft, one of said contact members being engageable by the insulated arm to cause the contacts to be made and broken, means compelling the sleeve and shaft to turn together in one direction and permitting the sleeve a free movement in the opposite direction, a spring motor in the box or casing operatively engaging the shaft, means for setting the motor, means for releasing the motor, and an electro-magnet in the box or casing adapted when energized to stop the motor.

5. A circuit controlling mechanism for an electrically actuated valve in a gasometer and meter conduit system of a gas meter testing apparatus, including a box or casing, a shaft in the casing and projecting therefrom, a sleeve loose on the shaft, a tripping arm secured to the sleeve and adapted to be engaged by a member on the index spindle of the gas meter, an insulating arm also fixed to the sleeve, a plurality of contact members fixed to the shaft, one of said contact members being engageable by the insulated arm to cause the contacts to be made and broken, means compelling the sleeve and shaft to turn together in one direction and permitting the sleeve a free movement in the opposite direction, a spring motor in the box or casing operatively engaging the shaft, means for setting the motor, means for releasing the motor, an electro-magnet in the box or casing, a lever pivoted between its ends in the box or casing, the upper end of said lever constituting an armature attracted by the magnet, a device on said upper end of the lever adapted to engage and stop the motor when the magnet is energized, a ratchet wheel constituting part of the motor, pawls adapted to engage the ratchet wheel and normally held out of engagement therewith, and springs carried by the lower end of the lever adapted to force the pawls into engagement with the ratchet wheel when the lever is swung due to the energizing of the magnet.

6. A circuit controlling mechanism for an electrically actuated valve in a gasometer and meter conduit system of a gas meter testing apparatus including a box or casing, a shaft extending through the box or casing, a spring motor in the box or casing, operatively engaging the shaft, manually operable means for turning the shaft to put the spring under tension, an arm fixed to turn with the shaft, a pivoted catch member adapted to engage the arm and hold the motor against movement when the spring is under tension, a spring-pressed push button adapted to engage the catch and when manually operated to release the catch and release the shaft to be turned by the motor, circuit controlling means operated by the turning movement of the shaft and means on the index spindle of the gas meter to open said circuit closing means.

7. A circuit controlling mechanism for an electrically actuated valve in a gasometer and meter conduit system of a gas meter testing apparatus including a box or casing, a shaft extending through the box or casing, spring motor in the box or casing, operatively engaging the shaft, manually operable means for turning the shaft to put the spring under tension, an arm fixed to turn with the shaft, a pivoted catch member adapted to engage the arm and hold the motor against movement when the spring is under tension, a spring-pressed push button adapted to engage the catch and when manually operated to release the catch and release the shaft to be turned by the motor, circuit controlling means operated by the turning movement of the shaft, said circuit closing means including a plurality of contacts, and a tripping arm loosely mounted on the shaft adapted to be moved by a member on the index spindle of the gas meter and having means co-operating therewith for operatively engaging the circuit controlling means.

8. A circuit controlling mechanism for an electrically actuated valve in a gasometer and meter conduit system of a gas meter testing apparatus including a box or casing, a shaft extending through the box or casing, a spring motor in the box or casing, operatively engaging the shaft, manually operable means for turning the shaft to put the spring under tension, an arm fixed to turn with the shaft, a pivoted catch member adapted to engage the arm and hold the motor against movement when the spring is under tension, a spring-pressed push button adapted to engage the catch and when manually operated to release the catch and release the shaft to be turned by the motor, circuit controlling means operated by the turning movement of the shaft, said circuit closing means including a plurality of contacts, a tripping arm loosely mounted on the shaft adapted to be moved by a member on the index spindle of the gas meter and having means co-operating therewith for operatively engaging the circuit controlling means, and an electro-magnet in the box or casing adapted when energized to lock the motor against operation.

9. A circuit controlling mechanism for an electrically actuated valve in a gasometer and meter conduit system of a gas meter testing apparatus including a box or casing, a shaft extending through the box or casing, a spring motor operatively connected to the shaft, an arm on the shaft, a catch member pivoted between its ends in the box or casing, one end being longer than the other and normally holding, by gravity, the other end of the lever in the path of movement of the arm to prevent operation of the motor, a spring-pressed push button extending outside of the casing, said push button having cam engagement with the longer end of said catch lever so that when said push button is forced inwardly the catch lever will be moved to a position to free the arm on the shaft and permit the motor to turn the same, and circuit closing contacts controlled by the movement of the shaft.

10. A circuit controlling mechanism for an electrically actuated valve in a gasometer and meter conduit system of a gas meter testing apparatus including a box or casing, a shaft extending through the box or casing, a spring motor operatively connected to the shaft, an arm on the shaft, a catch member pivoted between its ends in the box or casing, one end being longer than the other and normally holding, by gravity, the other end of the lever in the path of movement of the arm to prevent operation of the motor, a spring-pressed push button extending outside of the casing, said push button having cam engagement with the longer end of said catch lever so that when said push button is forced inwardly the catch lever will be moved to a position to free the arm on the shaft and permit the motor to turn the same, circuit closing contacts controlled by the movement of the shaft, and an electro-magnet in the box or casing adapted when energized to lock the motor against movement.

11. In a meter testing apparatus a tripping arm adapted for engagement by a finger secured to the index spindle of a gas meter, a contact assemblage consisting of three resilient contact members, the intermediate contact member being longer than the others and constituting a double-throw switch member, an arm fixed to move with the tripping arm and having means thereon operatively engaging the longer contact member, means for setting the tripping arm in a position above and in the path of movement of a finger on the index member, a spring motor adapted to move the tripping arm downwardly, a member operatively engaging said means and adapted when manually operated to release the setting means, permit the tripping arm to move downwardly into engagement with the finger, causing the longer contact member to move from one position to another, separating normally engaged contacts on the intermediate member with one of the members and causing engagement of contacts between the intermediate contact member and the third contact member, an electro-magnet, mechanism moved by the magnet when energized to lock the motor against movement, a solenoid operated valve, and means co-operating with the contacts and the solenoid operated valve and the electro-magnet to energize the latter when the valve is opened.

12. In a meter testing apparatus, a tripping arm adapted for engagement by a finger secured to the index spindle of a gas meter, a contact assemblage consisting of three resilient contact members, the intermediate contact member being longer than the others and constituting a double-throw switch member, an arm fixed to move with the tripping arm and having means thereon operatively engaging the longer contact member, means for setting the tripping arm in a position above and in the path of movement of the finger on the index member, a spring motor adapted to move the tripping arm downwardly, a member operatively engaging said means and adapted when manually operated to release the setting means, permit the tripping arm to move downwardly into engagement with the finger, causing the longer contact member to move from one position to another, separating normally engaged contacts on the intermediate member with one of the members and causing engagement of contacts between the intermediate contact member and the third contact member, an electro-magnet, mechanism moved by the magnet when energized to lock the motor against movement, a solenoid operated valve, means co-operating with the contacts and the solenoid operated valve and the electro-magnet to energize the latter when the valve is opened, said solenoid operated valve being located at the outlet end of the meter, and automatic means holding the valve open during a known cycle of operation of the meter.

13. In a meter testing apparatus, a tripping arm adapted for engagement by a finger secured to the index spindle of a gas meter, a contact assemblage consisting of three resilient contact members, the intermediate contact member being longer than the others and constituting a double-throw switch member, an insulated arm fixed to move with the tripping arm and having a pin thereon engaging the longer contact member, a gasometer, an outlet pipe for connecting the outlet of the gasometer with the inlet of a gas meter, a valve controlling the flow from the gasometer through the meter, means mounting the tripping arm for movement against the finger on the index spindle of the meter, to bring the longer contact member into engagement with one of the shorter contact members, means to lock the first mentioned means, and means co-operating with the second mentioned means for operating the valve and the second mentioned means.

14. In a meter testing apparatus, a tripping arm for engagement by a member on the index spindle of a gas meter, two contacts, a contact member movably mounted for engaging the said contacts one at a time, the said contact member being disposed for movement by the tripping arm, a spring-operated gear train for moving the tripping arm into engagement with the member on the spindle, a manually operable means for putting the spring under tension, a catch mechanism normally holding the gear train against movement, manually operable means for releasing the gear train, a solenoid operated valve controlling the flow of fluid through the gas meter, and an electro-magnet for stopping the gear train when the tripping arm engages the member on the index spindle to cause the opening of the valve.

PHILIP B. R. BAAS.